United States Patent [19]
Kimura et al.

[11] Patent Number: 5,224,714
[45] Date of Patent: Jul. 6, 1993

[54] NONCONTACTING FACE SEAL

[75] Inventors: Yoshikazu Kimura, Fujisawa; Hideo Tsuboi, Ohta, both of Japan

[73] Assignee: Ebara Corporation, Tokyo, Japan

[21] Appl. No.: 730,988

[22] Filed: Jul. 16, 1991

[30] Foreign Application Priority Data

Jul. 18, 1990 [JP] Japan .................. 2-75559[U]

[51] Int. Cl.⁵ ............................................. F16J 15/34
[52] U.S. Cl. .................................. 277/96.1; 277/27; 277/81 R
[58] Field of Search ............ 277/96, 81 R, 96.1, 277/27; 384/112, 118, 123

[56] References Cited

U.S. PATENT DOCUMENTS

| | | | |
|---|---|---|---|
| 3,347,552 | 10/1967 | Frisch ............................ | 277/27 |
| 3,499,653 | 3/1970 | Gardner . | |
| 3,675,935 | 7/1972 | Ludwig et al. ................ | 277/74 X |
| 3,744,805 | 7/1973 | Heinrich ........................ | 277/96.1 |
| 3,767,212 | 10/1973 | Ludwig ......................... | 277/27 X |
| 3,804,424 | 4/1974 | Gardner ........................ | 277/96.1 X |
| 3,905,606 | 9/1975 | Florjancic ..................... | 277/27 |
| 4,099,729 | 7/1978 | Nylykke ........................ | 277/96.1 |
| 4,212,475 | 7/1980 | Sedy .............................. | 277/96.1 |
| 4,471,966 | 9/1984 | Timmermans et al. ....... | 277/27 |
| 4,884,945 | 12/1989 | Boutin et al. ................. | 277/96.1 X |

FOREIGN PATENT DOCUMENTS

| | | |
|---|---|---|
| 0072733 | 2/1983 | European Pat. Off. . |
| 0297381 | 1/1989 | European Pat. Off. . |
| 1650061 | 9/1969 | Fed. Rep. of Germany ........ 277/27 |
| 1964150 | 7/1970 | Fed. Rep. of Germany ..... 277/96.1 |
| 2222082 | 11/1973 | Fed. Rep. of Germany . |
| 0109771 | 6/1983 | Japan ................................. 277/27 |
| 0231268 | 12/1984 | Japan ............................... 277/96.1 |
| 0231269 | 12/1984 | Japan ............................... 277/96.1 |
| 0031775 | 2/1987 | Japan ................................. 277/27 |
| 0046068 | 2/1989 | Japan ................................. 277/27 |

OTHER PUBLICATIONS

Journal of Basic Engineering, Sep. 1965, pp. 547–558, "The Static and Dynamic Characteristics of the Spiral--Grooved Thrust Bearing" S. B. Malanoski et al.
NASA Tech Brief, Jul. 1968 (Brief 68-10270, Category 05).

Primary Examiner—William A. Cuchlinski, Jr.
Assistant Examiner—James K. Folker
Attorney, Agent, or Firm—Wenderoth, Lind & Ponack

[57] ABSTRACT

A noncontacting face seal has a stationary sealing ring and a rotating sealing ring with opposed radially extending sealing surfaces for restricting a fluid flow from a high pressure fluid side to a low pressure fluid side. The rotating sealing ring is moved out of contact with the stationary sealing ring due to hydrostatic force from the fluid. The noncontacting face seal comprises spiral grooves formed in one of the sealing surfaces and extending from a low pressure fluid side to a high pressure fluid side in a radial direction so as to pump fluid from the low pressure fluid side towards the high pressure fluid side, and a spaced portion formed in one of the sealing surfaces and extending inwardly from one circumference of the sealing surface at the high pressure fluid side so as to introduce fluid in the high pressure fluid side between the sealing surfaces.

11 Claims, 9 Drawing Sheets

NONCONTACTING FACE SEAL

BACKGROUND OF THE INVENTION

The present invention relates to a noncontacting face seal, and more particularly to a noncontacting face seal in which an end face of a rotating sealing ring rotatable with a rotating shaft and an end face of a stationary sealing ring facing the rotating sealing ring form sealing surfaces for restricting a fluid flow from a high pressure side to a low pressure side.

A noncontacting end face seal (hereinafter referred to as end face seal) is used for sealing the space between a rotating shaft and a housing thereof. The end face seal is incorporated in, for example, gas turbines or compressors which handle high pressure. In general, there are two types of noncontacting end face seals, one of which is a hydrostatic end face seal using the pressure of sealing fluid, the other of which is a hydrodynamic end face seal having a shape causing hydrodynamic action such as spiral grooves.

Next, the conventional hydrostatic end face seal will be described below with reference to FIGS. 12 and 13.

The end face seal comprises two annular sealing rings facing one another, one of which is a rotating sealing ring 3, the other of which is a stationary sealing ring 4. A rotating shaft 1 accommodated in a housing 9 is provided with a sleeve 2. The sleeve 2 is connected to the rotating sealing ring 3 through a pin. The stationary sealing ring 4 is pressed against the rotating sealing ring 3 by an urging force of springs 10 interposed between a sealing ring retainer 5 and a spring retainer 6. In the end face seal, the radially outer region of the rotating sealing ring 3 is located at a high pressure fluid side H and the radially inner region thereof is located at a low pressure fluid side L. The rotating sealing ring 3 is provided with an outwardly tapered surface 31 which makes the gap between the rotating sealing ring 3 and the stationary sealing ring 4 wider gradually. That is, the tapered surface 31 provides the necessary wedge-shaped space between the rotating sealing ring 3 and the stationary sealing ring 4 at the radially outer regions thereof for introducing fluid between two sealing rings. The rotating sealing ring 3 is further provided with a flat surface 32 inside the tapered surface 31.

In the end face seal of this type, when fluid enters into the wedge-shaped space between the rotating sealing ring 3 and the stationary sealing ring 4, the sealing surfaces are moved out of contact by hydrostatic forces from fluid pressure. The distance e between the outer edge of the tapered surface 31 of the rotating sealing ring 3 and the sealing surface of the stationary sealing ring 4, the inner diameter $2r_t$ of the tapered surface 31, the inside diameter $2r_1$ of the sealing surface and the outside diameter $2r_2$ of the sealing surface are properly arranged so that the gap between the sealing surfaces becomes as small as possible and the stiffness of the fluid film formed between the sealing surfaces is enhanced.

In the conventional end face seal as shown in FIGS. 12 and 13, in order to reduce leakage of fluid between the sealing surfaces, it is necessary to make the gap of the sealing surfaces small. However, there is a limit to how much the gap can be reduced. Therefore, in the end face seal of this type, it is difficult to reduce the leakage of fluid beyond a certain amount.

On the other hand, another type of end face seal with spiral grooves is disclosed in U.S. Pat. No. 3,499,653. In U.S. Pat. No. 3,499,653 the end face seal comprises a rotating sealing ring and a stationary sealing ring as with the end face seal in FIGS. 11 and 12. One of the sealing rings has spiral grooves and a tapered surface to provide the necessary wedge-shaped space at the radially outer regions thereof. The spiral grooves extend from a high pressure fluid side to a low pressure fluid side so as to pump fluid from the high pressure side to the low pressure side. Under normal operation, the fluid film is formed between the sealing surfaces by hydrostatic action and hydrodynamic action, thereby restricting fluid flow from the high pressure side to the low pressure side.

However, in the above end face seal, the spiral grooves extend from the high pressure side to the low pressure side so as to pump fluid from the high pressure side towards the low pressure side. Therefore, under dynamic conditions, the spiral grooves serve to leak fluid from the high pressure side to the low pressure side. That is, the total leakage rate of fluid from the sealing surfaces is equal to the leakage rate caused by the pressure difference between the high pressure and the low pressure plus the leakage rate caused by the pumping action of the spiral grooves. Consequently, in the end face seal of this type, it is difficult to reduce leakage of fluid beyond a certain amount less as with the end face seal in FIGS. 12 and 13.

SUMMARY OF THE INVENTION

It is therefore an object of the present invention to provide a noncontacting face seal which can reduce leakage of fluid from a high pressure side to a low pressure side.

According to the present invention, there is provided a noncontacting face seal having a stationary sealing ring and a rotating sealing ring with opposed radially extending sealing surfaces, the rotating sealing ring being brought out of contact with the stationary sealing ring when a hydrostatic force due to high pressure is applied, the improvement comprising: spiral grooves formed in one of the sealing surfaces and extending from a low pressure fluid side to a high pressure fluid side in a radial direction so as to pump fluid in the low pressure fluid side towards the high pressure fluid side; and a spaced portion comprising a tapered surface or a recess formed in one of the sealing surfaces, the spaced portion extending inwardly from one circumference of the sealing surface at the high pressure fluid side so as to introduce fluid from the high pressure fluid side to between the sealing surfaces.

With the above structure, high pressure fluid is introduced into the spaced portion comprising the tapered surface or the recess, and the rotating sealing ring is moved out of contact with the stationary sealing ring due to hydrostatic force from the fluid pressure. Further, when the rotating sealing ring is rotated, under dynamic conditions, the end face seal is exposed to hydrostatic forces from the fluid pressure and hydrodynamic forces from the spiral grooves, whereby a fluid film is formed between the sealing surfaces and a gap is formed between the sealing surfaces. The leakage of fluid is restricted by keeping the gap between the sealing surfaces small. That is, the spiral groove pattern pumps fluid (gas) from the low pressure fluid side to the high pressure fluid side to thereby resist to fluid flow due to a pressure difference between the high pressure side and the low pressure side, thus reducing the leakage flow of fluid between the sealing surfaces.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE INVENTION

A noncontacting face seal of the present invention will be described below with reference to FIGS. 1 through 5.

Figure 1:
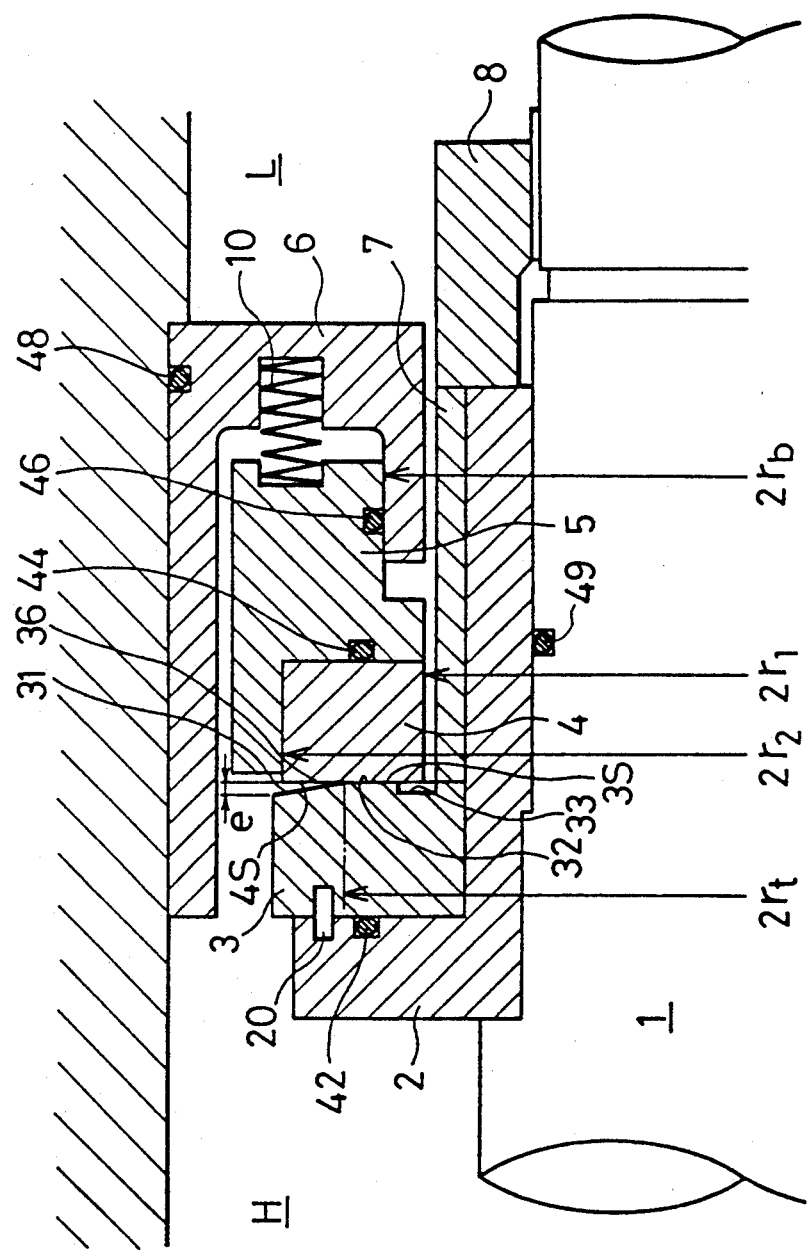
FIG. 1 is a cross-sectional view showing a noncontacting face seal according to an embodiment of the present invention.

In FIG. 1, a sleeve 2 is fixedly secured to a rotating shaft 1 accommodated in a housing 9. A rotating sealing ring 3 is connected to the sleeve 2 through a pin 20. The rotating sealing ring 3 faces a stationary sealing ring 4 and contacts the stationary sealing ring 4 in a state of surface contact at the sealing surfaces comprising a sealing surface 3S and a sealing surface 4S. Incidentally, the rotating sealing ring 3 is fixedly secured to the sleeve 2 by a sleeve 7 and a retaining nut 8.

A stationary sealing ring 4 is pressed against the rotating sealing ring 3 by an urging force of coiled springs 10 interposed between a sealing ring retainer 5 and a spring retainer 6. Reference numerals 42, 44, 46, 48, 49 represent sealing members such as O-rings in FIG. 1.

Figure 2:
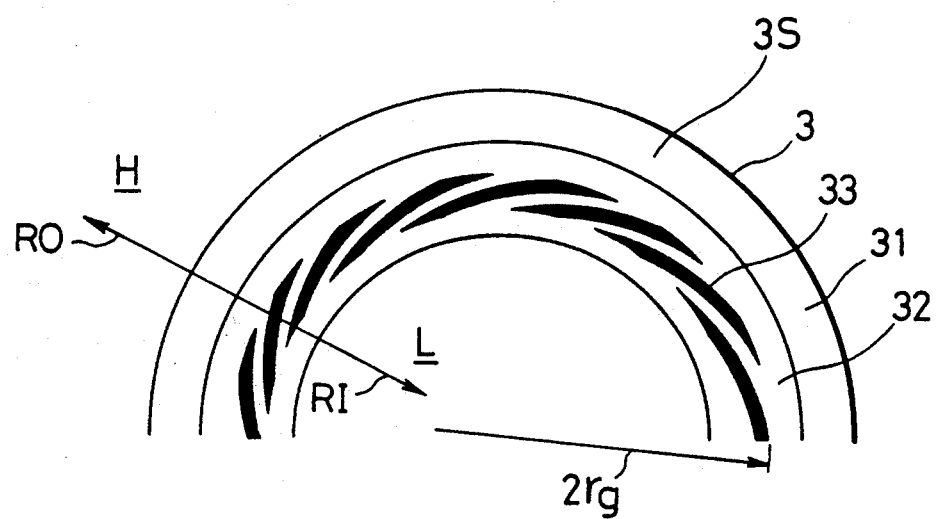
FIG. 2 is a first end view showing spiral grooves formed on a rotating sealing ring of the noncontacting face seal according to the first embodiment of the present invention.
Figure 3:
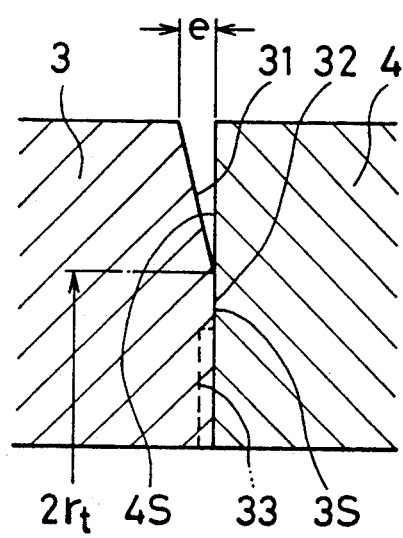
FIG. 3 is an enlarged cross-sectional view showing the rotating sealing ring and a stationary sealing ring of the noncontacting face seal according to the first embodiment of the present invention.

The rotating ring 3 is provided with an outwardly tapered surface 31 which creates a gap between the rotating sealing ring 3 and the stationary sealing ring 4 which gradually widens. That is, the tapered surface 31 constitutes a spaced portion and provides the necessary wedge-shaped space between the rotating sealing ring 3 and the stationary sealing ring 4 at the radially outer regions thereof for introducing fluid between the two sealing rings 3, 4. The rotating sealing ring 3 is further provided with a flat surface 32 at the central portion of the sealing surface 3S and spiral grooves 33 at the radially inner region of the sealing surface 3S. FIG. 2 shows the sealing surface 3S of the rotating ring 3. In FIG. 2, the tapered surface 31 at the radially outer region (denoted at RO) is located at the high pressure fluid side H, the spiral grooves 33 at the radially inner region (denoted at RI) is located at the low pressure fluid side L. The spiral grooves 33 are open to the low pressure fluid side L and extend from the low pressure fluid side L to the high pressure fluid side H as shown in FIG. 2 so as to pump fluid from the low pressure fluid side L towards the high pressure fluid side H. In FIGS. 1 and 3, reference character e represents the distance between the outer edge of the tapered surface 31 of the rotating sealing ring 3 and the sealing surface 4S of the stationary sealing ring 4 when the two sealing rings contact each other. The dimension e of the tapered surface 31, the inner diameter $2r_t$ of the tapered surface 31, the inside diameter $2r_1$ of the sealing surface, the outside diameter $2r_2$ of the sealing surface and the balance diameter $2r_b$ are properly arranged so that the gap between the sealing surfaces is as small as possible and the stiffness of a fluid film formed between the sealing surfaces is enhanced.

Figure 4:
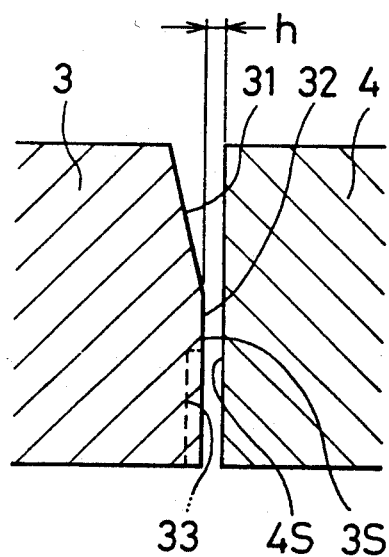
FIG. 4 is a cross-sectional view showing an operation of the noncontacting face seal according to the first embodiment of the present invention.

Next, operation of the spiral groove face seal thus constructed will be described below with reference to FIG. 4.

When fluid at the high pressure side H enters into the wedge-shaped space between the rotating sealing ring 3 and the stationary sealing ring 4, the sealing surface 3S of the rotating sealing ring 3 is moved out of contact with the sealing surface 4S of the stationary sealing ring 4 by hydrostatic forces from fluid pressure. Relative motion of the rotating sealing ring 3 and the stationary sealing ring 4 is caused by rotating the rotating shaft 1. At this time, the end face seal of the present invention maintains the gap h between the two sealing rings 3, 4 as small as possible, as shown in FIG. 4 and enables the stiffness of the fluid film to be enhanced.

Further, according to the present invention, since the end face seal is provided with the spiral grooves 33 on the sealing surface 3S, the spiral groove pattern pumps fluid (gas) outwardly from the low pressure fluid side L to the high pressure fluid side H. Therefore, fluid flow due to the pressure difference between the high pressure fluid side H and the low pressure fluid side L meets with resistance created by the pumping action of the spiral grooves, thereby reducing the leakage rate of the fluid.

Figure 5:
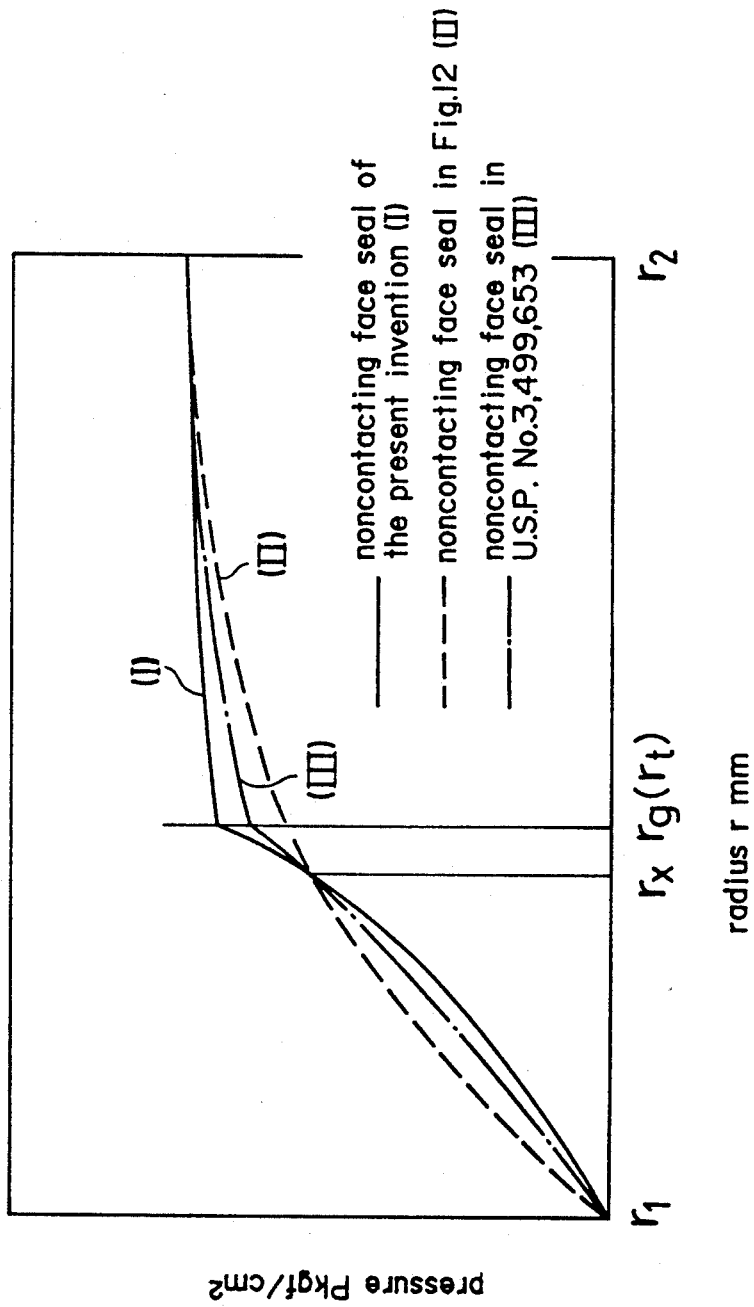
FIG. 5 is a graph showing the pressure distribution in a radial direction on the sealing surfaces.
Figure 12:
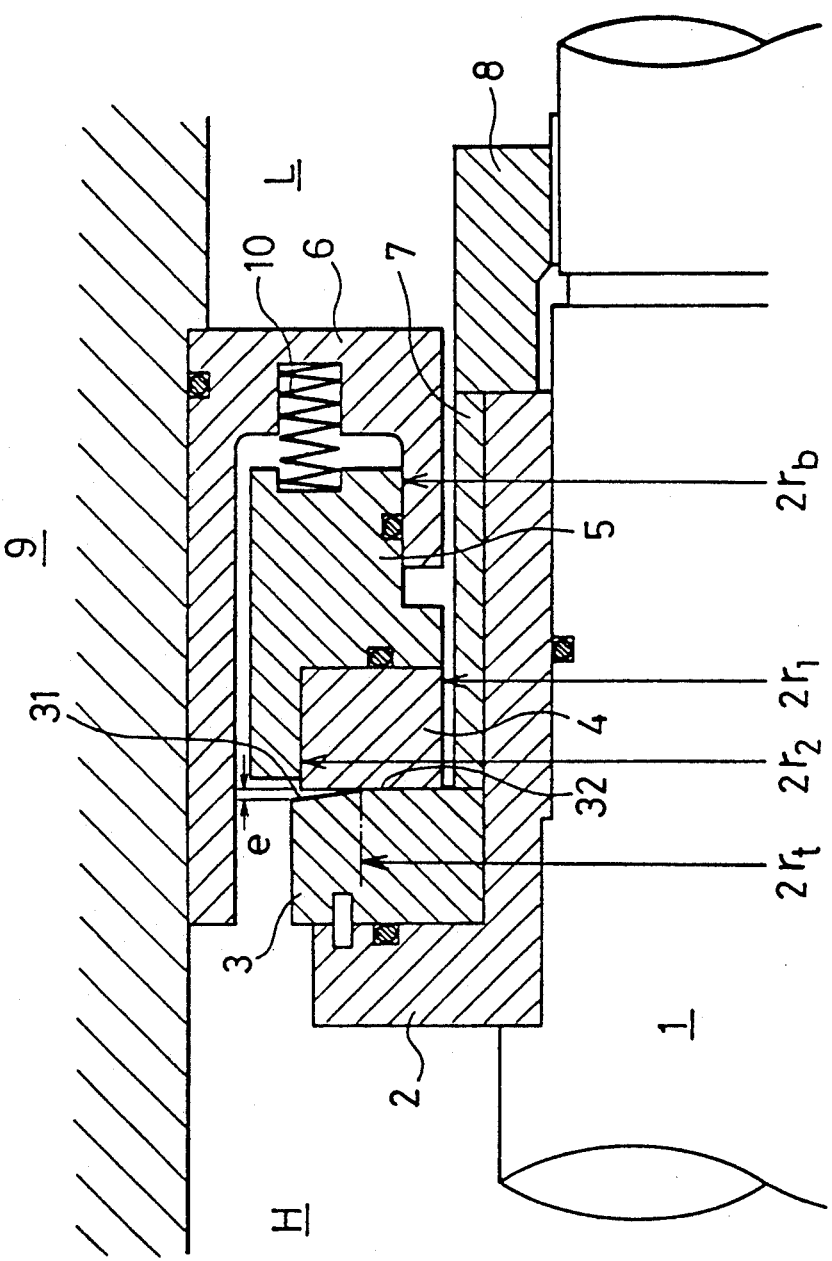
FIG. 12 is a cross-sectional view showing a conventional end face seal without spiral grooves.
Figure 13:
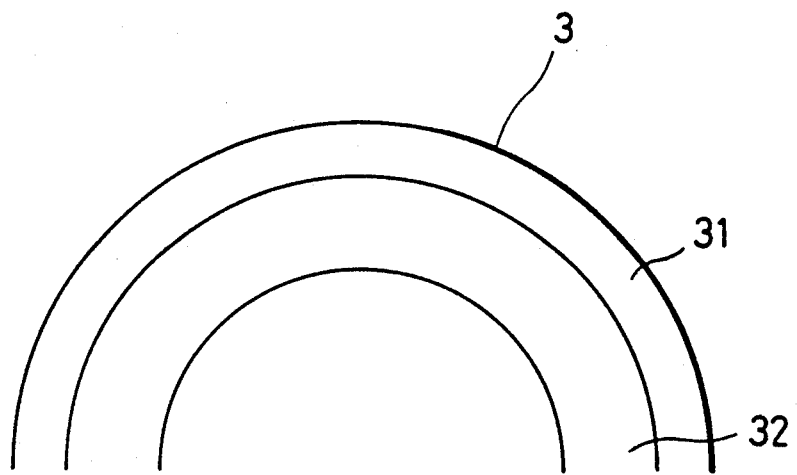
FIG. 13 is an end view showing a sealing surface of the conventional end face seal.

FIG. 5 shows the pressure distribution in a radial direction on the sealing surfaces. On the graph, the pressure P $kgf/cm^2$ is plotted on the vertical axis, and the radius r mm is plotted on the horizontal axis. In FIG. 5, the noncontacting face seal of the present invention (hereinafter the noncontacting face seal I) is represented by a solid line, the conventional noncontacting face seal in FIG. 12 (hereinafter the noncontacting face seal II) is represented by a broken line and the noncontacting face seal in U.S. Pat. No. 3,499,653 (hereinafter the noncontacting face seal III) is represented by a alternate long and short dash line. In the case of the noncontacting face seal I, the spiral grooves 33 extend to the inner diameter $2r_t$ of the tapered surface 31. The pressure P of the noncontacting face seal I is lower than those of the noncontacting face seals II and III between $r_1$ and $r_x$ in the vicinity of $r_g(r_t)$. Therefore, in the noncontacting face seal I, the pressure difference between each point and the low pressure side L is small compared with the noncontacting face seals II and III. Thus the leakage rate of the noncontacting face seal I from the high pressure side H to the low pressure side L is smaller than those of the noncontacting face seals II and III.

Next, other embodiments of the present invention will be described below with reference to FIGS. 6 through 11. Those parts and components in FIGS. 6 through 11 which are structurally and functionally identical to those shown in FIGS. 1 through 4 are denoted using the same reference numerals. FIGS. 6 through 11 show sealing surfaces 3S, 4S of the rotating sealing ring 3 and the stationary sealing ring 4 schematically.

Figure 6:
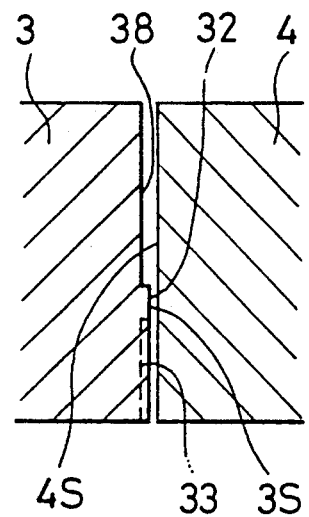
FIG. 6 is a cross-sectional view showing a noncontacting face seal according to a second embodiment of the present invention.

FIG. 6 is a cross-sectional view showing a noncontacting face seal according to a second embodiment of the present invention. According to this embodiment, the rotating sealing ring 3 is provided with a recess 38 at the radially outer region thereof in place of the tapered surface 31 of FIG. 3. The recess 38 serves as a spaced portion for introducing fluid between two sealing rings 3, 4. The area where the recess 38 is formed is the same area as the tapered surface 31 of FIG. 3. The second embodiment has the same function and effect as the first embodiment in FIGS. 1 through 4.

Figure 7A:
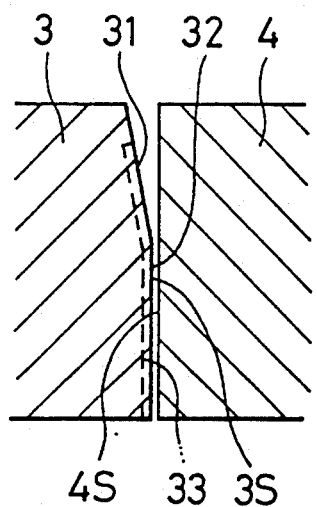
FIG. 7(a) and (b) is a cross-sectional view showing a noncontacting face seal according to a third embodiment of the present invention.
Figure 7B:
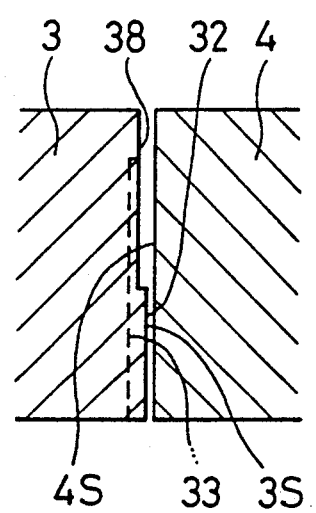

FIGS. 7(a) and (b) are cross-sectional views showing a noncontacting face seal according to a third embodiment of the present invention. According to this embodiment, the rotating sealing ring 3 is provided with a tapered surface 31 in FIG. 7(a), or a recess 38 in FIG. 7(b). The spiral grooves 33 extend beyond the flat surface 32 to the tapered surface 31 (FIG. 7(a)) or the recess 38 (FIG. 7(b)). The pumping action of the spiral grooves 33 of this embodiment is greater than that of the first embodiment shown in FIGS. 1 through 4.

Figure 8A:
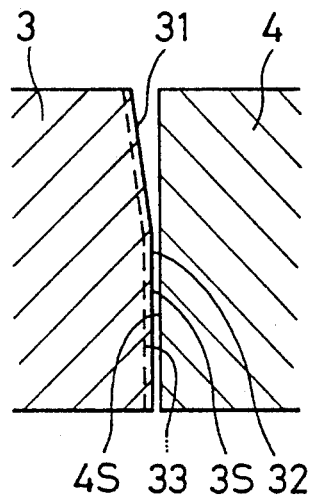
FIGS. 8(a) and (b) is a cross-sectional view showing a noncontacting face seal according to a fourth embodiment of the present invention.
Figure 8B:
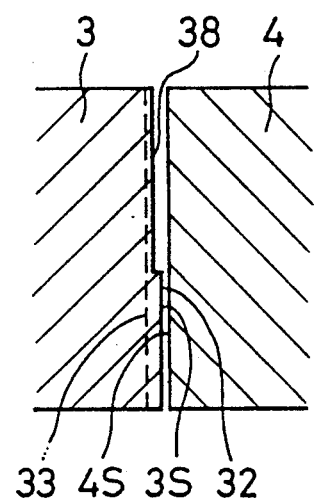

FIGS. 8(a) and (b) are cross-sectional views showing a noncontacting face seal according to a fourth embodiment of the present invention. According to this embodiment, the rotating sealing ring 3 is provided with a tapered surface 31 in FIG. 8(a), or a recess 38 in FIG. 8(b). The spiral grooves 33 extend beyond the flat surface 32 to the outer edge of the tapered surface 31 (FIG. 8(a)) or the outer edge of the recess 38 (FIG. 8(b)). The pumping action of the spiral grooves 33 of this embodiment is greater than that of the third embodiment.

In brief summary, the spiral groove area extends progressively further toward the high pressure fluid side H in FIG. 6, FIG. 7 and FIG. 8, and the pumping action caused by the spiral grooves 33 is progressively greater in FIG. 6, FIG. 7 and FIG. 8. The spiral groove area should be determined taking into consideration the requirements for thickness of the fluid film between the sealing surfaces, the film stiffness and the leakage rate of the high pressure fluid.

Figure 9A:
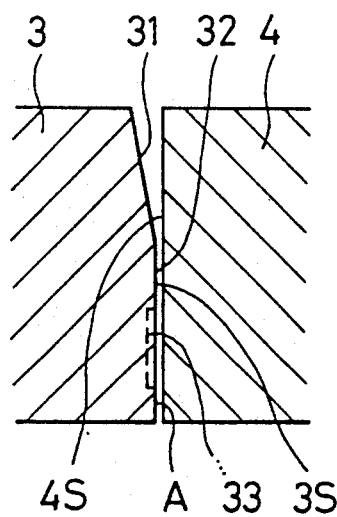
FIGS. 9(a) and (b) is a cross-sectional view showing a noncontacting face seal according to a fifth embodiment of the present invention.
Figure 9B:
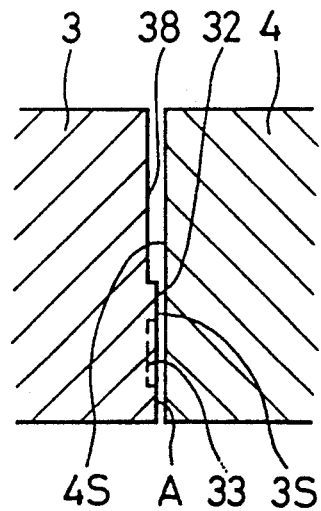

FIGS. 9(a) and (b) are cross-sectional views showing a noncontacting face seal according to a fifth embodiment of the present invention. According to this embodiment, the rotating sealing ring 3 is provided with a tapered surface 31 in FIG. 9(a), or a recess 38 in FIG. 9(b). The spiral grooves 33 extend from inner positions spaced away from the inner circumference of the sealing surface 3S and are located in an area of a flat surface 32 adjacent to the tapered surface 31 (FIG. 9(a)) or the recess 38 (FIG. 9(b)). In this embodiment, a flat surface area A without the spiral grooves 33 is provided on the sealing surface 3S. Therefore, in the case where the fluid is under low pressure when the machine incorporating the end face seal is stopped, the sealing surfaces are not moved out of contact by only the hydrostatic force from the fluid, and thus fluid is prevented from leaking out between the contacting portion of the flat surface area A and the sealing surface 4S.

Figure 10A:
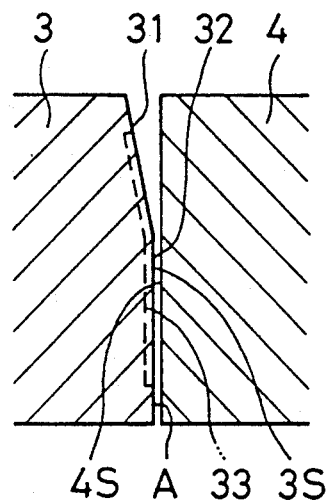
FIGS. 10(a) and (b) is a cross-sectional view showing a noncontacting face seal according to a sixth embodiment of the present invention.
Figure 10B:
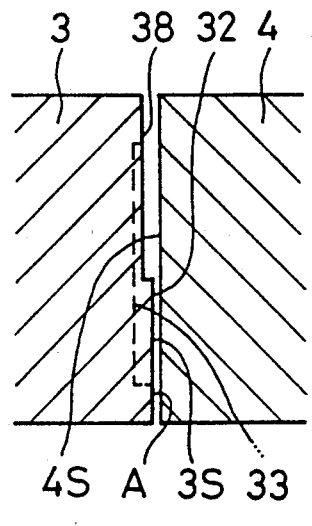

FIGS. 10(a) and (b) are cross-sectional views showing a noncontacting face seal according to a sixth embodiment of the present invention. According to this embodiment, the rotating sealing ring 3 is provided with a tapered surface 31 in FIG. 10(a), or a recess 38 in FIG. 10(b). The spiral grooves 33 extend from inner positions spaced away from the inner circumference of the sealing surface 3S. The spiral grooves 33 extend beyond the flat surface 32 to the tapered surface 31 (FIG. 10(a)) or the recess 38 (FIG. 10(b)). In this embodiment, a flat surface area A without the spiral grooves 33 is provided on the sealing surface 3s as in the fifth embodiment. Therefore, in the case where fluid is under low pressure when the machine is stopped, the sealing surfaces are not moved out of contact by only the hydrostatic force of the fluid and thus the fluid is prevented from leaking out by a contacting portion of the flat surface area A and the sealing surface 4S. Further, the pumping action of the spiral grooves 33 of this embodiment is greater than that of the fifth embodiment.

Figure 11A:
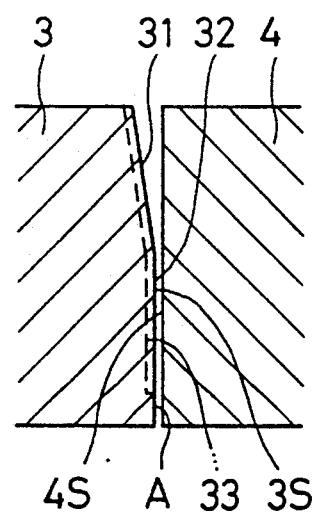
FIGS. 11(a) and (b) is a cross-sectional view showing a noncontacting face seal according to a seventh embodiment of the present invention.
Figure 11B:
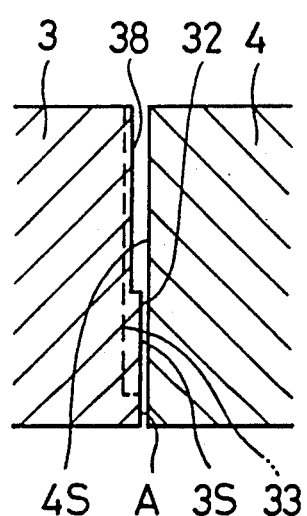

FIGS. 11(a) and (b) are cross-sectional views showing a noncontacting face seal according to a seventh embodiment of the present invention. According to this embodiment, the rotating sealing ring 3 is provided with a tapered surface 31 in FIG. 11(a), or a recess 38 in FIG. 11(b). The spiral grooves 33 extend from inner positions spaced away from the inner circumference of the sealing surface 3S. The spiral grooves 33 extend beyond the flat surface 32 to the outer edge of the tapered surface 31 (FIG. 11(a)) or the outer edge of the recess 38 (FIG. 11(b)). In this embodiment, a flat surface area A without the spiral grooves 33 is provided on the sealing surface 3S as in the fifth embodiment. Therefore, in the case where the fluid is under low pressure when the machine is stopped, the sealing surfaces are not moved out of contact by only the hydrostatic force the fluid and thus the fluid is prevented from leaking out by a contacting portion of the flat surface area A and the sealing surface 4S. Further, the pumping action of the spiral grooves 33 of this embodiment is greater than that of the sixth embodiment.

In the above embodiments, the radially outer region RO of the rotating sealing ring 3 is the high pressure fluid side H, and the radially inner region RI is the low pressure fluid side L. However, it should be noted that the radially outer region RO of the rotating sealing ring 3 may be the low pressure fluid side L, and the radially inner region may be the high pressure fluid side H.

Further, in the above embodiments, the spiral grooves 33 are provided on the sealing surface 3S of the rotating sealing ring 3. However the spiral grooves 33 may be provided on the stationary sealing ring 4.

As is apparent from the forgoing description, according to the present invention, pumping action is generated by the spiral grooves formed in one of the sealing surfaces so as to resist against leakage flow due to the pressure difference between the high pressure fluid side and the low pressure fluid side, thus reducing leakage rate of fluid from the sealing surfaces.

Further, since the spaced portion is provided between the two sealing rings by the tapered surface or the recess formed in one of the sealing surfaces, fluid in the high pressure side can enter into the spaced portion to thereby move the sealing surfaces out of contact.

Although certain preferred embodiments have been shown and described, it should be understood that many changes and modifications may be made therein without departing from the scope of the appended claims.

What is claimed is:

1. A noncontacting face seal for sealing against flow of fluid from a high pressure side of said seal to a low pressure side of said seal, comprising:
    a stationary sealing ring having a first annular sealing surface;
    a rotating sealing ring rotatably mounted relative to said stationary sealing ring and having a second annular sealing surface facing said first annular sealing surface;
    wherein said first and second annular sealing surfaces respectively include first and second annular contact areas which are adapted to contact one another;
    wherein a biasing means is provided for biasing said stationary sealing ring toward said rotating sealing ring such that, without outside influences, said first annular contact area contacts said second annular contact area, and such that when a high fluid pressure is exerted on said first annular sealing surface a gap is formed between said first and second annular contact areas;
    wherein one of said first and second annular sealing surfaces includes a spaced portion which is spaced apart from the other of said first and second annular sealing surfaces when said first annular contact area is in contact with said second annular contact area, said spaced portion defining a fluid introduction means for introducing high pressure fluid from the high pressure side of said seal into between said first and second annular sealing surfaces so as to cause the gap to be formed between said first and second annular contact areas; and
    wherein spiral grooves are formed in one of said first and second annular contact areas and extend radially away from the high pressure side of said seal from a position spaced from a periphery of said seal at the high pressure side of said seal, said spiral grooves defining a pumping means for pumping fluid from the low pressure side of said seal toward the high pressure side of said seal when said rotating sealing ring is rotated relative to said stationary sealing ring, in order to resist flowing of fluid from the high pressure side to the low pressure side.

2. A noncontacting face seal as recited in claim 1, wherein
    said spaced portion comprises a tapered surface which is inclined relative to one of said first and second annular contact areas, such that a space formed between said spaced portion and said other of said first and second annular sealing surfaces narrows from the high pressure side toward the low pressure side of said seal.

3. A noncontacting face seal as recited in claim 1, wherein
    said spaced portion comprises an annular flat recessed surface, said recessed surface being parallel to a remainder of said one of said first and second annular sealing surfaces.

4. A noncontacting face seal as recited in claim 1, wherein
    said spiral grooves are formed over an annular spiral groove area extending radially from one of an inner circumference and an outer circumference of the one of said first and second annular sealing surfaces having said one of said first and second annular contact areas.

5. A noncontacting face seal as recited in claim 4, wherein
    said annular spiral groove area extends radially beyond said one of said first and second contact areas and into said spaced portion.

6. A noncontacting face seal as recited in claim 1, wherein
    said spiral grooves are formed over an annular spiral groove area extending radially from an inner circumference of the one of said first and second annular sealing surfaces having said one of said first and second annular contact areas.

7. A noncontacting face seal as recited in claim 1, wherein
    said spiral grooves are formed in said second annular sealing surface of said rotating sealing ring.

8. A noncontacting face seal as recited in claim 1, wherein
    said spiral grooves are formed in said first annular sealing surface of said stationary sealing ring.

9. A noncontacting face seal for sealing against flow of fluid from a high pressure side of said seal to a low pressure side of said seal, comprising:
    a rotating sealing ring having an annular sealing surface;
    wherein said annular sealing surface includes an annular flat contact area and an annular spaced portion spaced axially inwardly from said annular flat contact area, said annular spaced portion defining a fluid introduction means for introducing fluid from the high pressure side of said seal into between said annular sealing surface and an annular sealing surface of a stationary sealing ring when a stationary sealing ring is mounted adjacent said rotating sealing ring to press the sealing surfaces apart; and
    wherein spiral grooves are formed in said annular flat contact area and extend radially away from the high pressure side of said seal from a position spaced from the high presence side of said seal, said spiral grooves defining a pumping means for pumping fluid from the low pressure side of said seal toward the high pressure side of said seal when said rotating sealing ring is rotated, in order to resist flowing of fluid from the high pressure side to the low pressure side.

10. A noncontacting face seal as recited in claim 9, wherein
    said annular spaced portion comprises a tapered surface which is inclined relative to said annular contact area.

11. A noncontacting face seal as recited in claim 9, wherein
    said annular spaced portion comprises an annular flat recessed surface, said recessed surface being parallel to said annular contact area.

* * * * *